United States Patent
Daynes et al.

(10) Patent No.: US 7,627,621 B2
(45) Date of Patent: Dec. 1, 2009

(54) METHOD AND SYSTEM FOR MINOR GARBAGE COLLECTION

(75) Inventors: Laurent Philippe Daynes, Saint-Ismier (FR); Sunil Soman, Goleta, CA (US); Grzegorz Jan Czajkowski, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 194 days.

(21) Appl. No.: 11/705,361

(22) Filed: Feb. 12, 2007

(65) Prior Publication Data

US 2008/0195680 A1    Aug. 14, 2008

(51) Int. Cl.
G06F 17/30    (2006.01)

(52) U.S. Cl. .................. 707/206; 707/200; 707/205

(58) Field of Classification Search ......... 707/205–206; 711/170
See application file for complete search history.

(56) References Cited

U.S. PATENT DOCUMENTS

| | | | |
|---|---|---|---|
| 4,989,134 A | | 1/1991 | Shaw |
| 5,355,483 A | * | 10/1994 | Serlet .......................... 711/154 |
| 5,652,883 A | * | 7/1997 | Adcock ....................... 707/206 |
| 5,687,368 A | * | 11/1997 | Nilsen ..................... 707/103 R |
| 5,692,193 A | | 11/1997 | Jagannathan et al. |
| 5,900,001 A | * | 5/1999 | Wolczko et al. .............. 707/206 |
| 5,903,900 A | * | 5/1999 | Knippel et al. ............... 707/206 |
| 5,915,255 A | * | 6/1999 | Schwartz et al. ............. 707/206 |
| 5,920,876 A | * | 7/1999 | Ungar et al. ................. 707/206 |
| 6,038,572 A | * | 3/2000 | Schwartz et al. ............. 707/206 |
| 6,049,810 A | * | 4/2000 | Schwartz et al. ............. 707/206 |
| 6,081,665 A | * | 6/2000 | Nilsen et al. ................. 717/116 |
| 6,115,782 A | * | 9/2000 | Wolczko et al. .............. 711/100 |
| 6,249,793 B1 | * | 6/2001 | Printezis et al. ............. 707/206 |
| 6,308,185 B1 | | 10/2001 | Grarup et al. |
| 6,493,730 B1 | * | 12/2002 | Lewis et al. ................. 707/206 |
| 6,560,773 B1 | * | 5/2003 | Alexander et al. .......... 717/128 |
| 6,622,226 B1 | | 9/2003 | Dussud |

(Continued)

OTHER PUBLICATIONS

Soman, S., Daynes, L., Krintz, C., "Task-Aware Garbage Collection in a Multi-Tasking Virtual Machine", ISMM'06, Ottawa, Ontario, Canada, Jun. 10-11, 2006, pp. 64-73.

(Continued)

*Primary Examiner*—Don Wong
*Assistant Examiner*—Hanh B Thai
(74) *Attorney, Agent, or Firm*—Osha • Liang LLP

(57) ABSTRACT

A method for minor garbage collection involves marking cards as clean, where the cards designate ranges of memory locations in a shared older generation, marking a card as dirty to obtain a dirty card when a reference field of an object is modified, where the object is allocated in one of multiple promotion areas, where the promotion area is used to promote objects to the shared older generation only for a single task, and where the card designates the reference field's memory location, examining the promotion areas and the cards to identify a region of the dirty card overlapping the promotion area, where promotion areas associated with other tasks are ignored, scanning the region of the dirty card overlapping the promotion area to identify roots of live young objects associated with the single task, and freeing a young object associated with the single task not identified as live during scanning.

20 Claims, 7 Drawing Sheets

U.S. PATENT DOCUMENTS

| | | | |
|---|---|---|---|
| 6,671,707 B1 * | 12/2003 | Hudson et al. | 707/206 |
| 6,826,583 B1 | 11/2004 | Flood et al. | |
| 6,839,822 B2 * | 1/2005 | Knippel et al. | 711/170 |
| 6,928,460 B2 * | 8/2005 | Nagarajan et al. | 707/206 |
| 7,039,664 B2 * | 5/2006 | Garthwaite | 707/206 |
| 7,043,509 B2 * | 5/2006 | Detlefs | 707/206 |
| 7,051,056 B2 * | 5/2006 | Rodriguez-Rivera et al. | 707/206 |
| 7,089,272 B1 * | 8/2006 | Garthwaite et al. | 707/206 |
| 7,107,426 B2 * | 9/2006 | Kolodner et al. | 711/170 |
| 7,114,045 B1 * | 9/2006 | Pliss et al. | 711/159 |
| 7,149,866 B2 * | 12/2006 | Blandy | 711/170 |
| 7,246,142 B2 * | 7/2007 | Sexton et al. | 707/206 |
| 7,454,448 B1 * | 11/2008 | Daynes et al. | 707/206 |
| 2002/0133533 A1 * | 9/2002 | Czajkowski et al. | 709/107 |
| 2002/0194421 A1 | 12/2002 | Berry et al. | |
| 2004/0162861 A1 | 8/2004 | Detlefs | |
| 2006/0155791 A1 * | 7/2006 | Tene et al. | 707/206 |
| 2006/0230087 A1 * | 10/2006 | Andreasson | 707/206 |
| 2007/0016634 A1 | 1/2007 | Sekiguchi et al. | |
| 2007/0180002 A1 * | 8/2007 | Printezis et al. | 707/206 |
| 2007/0288538 A1 * | 12/2007 | Bacon et al. | 707/206 |
| 2009/0150465 A1 * | 6/2009 | Branda et al. | 707/206 |

OTHER PUBLICATIONS

Ungar, D., "Generation Scavenging: A Non-Disruptive High Performance Storage Reclamation Algorithm", Department of Electrical Engineering and Computer Sciences, University of California, 1984, pp. 157-167.

Wilson, P., "Uniprocessor Garbage Collection Techniques", International Workshop on Memory Management, St. Malo, France, Sep. 1992, 34 pages.

Czajkowski, G., Daynes, L., Titzer, B., "A Multi-User Virtual Machine", Proceedings of the General Track: USENIX Annual Technical Conference, 2003, pp. 85-98.

Czajkowski, G., Daynes, L., "Multitasking without Compromise: a Virtual Machine Evolution", Proceedings of the 2001 ACM SIGPLAN Conference on Object-Oriented Programming Systems, Languages and Applications, 2001, 14 pages.

Azagury, et al., "Combining Card Marking with Remembered Sets: How to Save Scanning Time", ISMM'98 Proceedings of the First International Symposium on Memory Management, vol. 34(3) of ACM SIGPLAN Notices, Vancouver, Oct. 1998. pp. 10-19.

Hölzle, U, "A Fast Write Barrier for Generational Garbage Collectors", OOPSLA'93 Garbage Collection Workshop, Washington, D.C., Oct. 1993, 6 pages.

Hosking, A. L., Hudson, R. L., "Remembered sets can also play cards", OOPSLA'93 Workshop on Garbage Collection in Object-Oriented Systems, Washington, D.C., Sep. 1993, 8 pages.

Hosking, A. L., Moss, J. E. B., Stefanovic, D., "A Comparative Performance Evaluation of Write Barrier Implementations", Proceedings from the ACM Conference on Object-Oriented Programming Systems, Languages, and Applications, Vancouver, Canada, Oct. 1992, 18 pages.

Hudson, R. L., et al., "Garbage Collecting in the World: One Car at a Time", Proceedings of the 12th ACM SIGPLAN conference on Object-oriented programming, systems, languages, and applications, 1997, 14 pages.

"Run and Reporting Rules for SPEC JVM Client98 Benchmark Suite", http://www.spec.org/jvm98/jvm98/doc/runrules.html, Jun. 18, 1998, 10 pages.

Domani, T., et al., "Thread-Local Heaps for Java", ISMM'02, Berlin, Germany, Jun. 20-21, 2002, pp. 76-87.

Daynes, L., Soman, S., Czajkowski, G., "Using Promotion Areas to improve Garbage Collection in multi-tasking Virtual Machine", Sep. 7, 2005, 18 pages.

* cited by examiner

METHOD AND SYSTEM FOR MINOR GARBAGE COLLECTION

CROSS-REFERENCE TO RELATED APPLICATIONS

Subject matter contained in the present application may be related to subject matter contained in copending U.S. patent application Ser. No. 11/705,378 entitled "Method and System for Garbage Collection in a Multitasking Environment," filed concurrently with this document and in the names of the same inventors and commonly owned by the same assignee, which is hereby incorporated by reference in its entirety.

BACKGROUND

In computer systems, garbage collection refers to automated memory reclamation. Specifically, a garbage collector is a process that differentiates between live objects (i.e., objects that are still in use) and dead objects (i.e., objects that are no longer in use). Differentiating between live objects and dead objects typically involves traversing a graph of live objects to identify objects that should not be discarded.

Once live objects are identified, the garbage collector frees memory occupied by dead objects, and the freed memory is then available for other uses. In contrast, manual memory reclamation requires software developers to write code to explicitly free memory when objects are no longer needed. Errors in manual memory reclamation code may result in unnecessarily large memory footprints, memory leaks, etc. Thus, garbage collection reduces the probability of such errors occurring.

Garbage collection may be used in many different operating environments. For example, garbage collection may be used in a multitasking environment. A task is a set of executable instructions loaded into memory, and multitasking refers to situations in which multiple tasks are loaded into memory simultaneously. Specifically, each task is an isolated unit of execution and generally cannot access objects associated with other tasks. If a computer system includes only a single processor, only a single task can execute at a time. Still, execution may transfer from one task to another. For example, execution may transfer if an executing task reaches a stopping point, if a pending task has higher priority, if a maximum execution time is reached for an executing task, etc. In multiprocessor computer systems, tasks may execute on each processor concurrently.

SUMMARY

In general, in one aspect, the invention relates to a method for minor garbage collection. The method comprises marking a plurality of cards as clean, wherein the plurality of cards designates ranges of memory locations in a shared older generation, marking a card selected from the plurality of cards as dirty to obtain a dirty card when a reference field of an object is modified, wherein the object is allocated in a promotion area selected from a plurality of promotion areas, wherein the promotion area is used to promote objects to the shared older generation only for a single task, and wherein a memory location of the reference field is designated by the card, examining the plurality of promotion areas and the plurality of cards to identify a region of the dirty card overlapping the promotion area, wherein promotion areas associated with other tasks are ignored, scanning the region of the dirty card overlapping the promotion area to identify roots of live young objects associated with the single task, and freeing a young object associated with the single task not identified as live during scanning.

In general, in one aspect, the invention relates to a system. The system comprises a young generation for storing young objects, a shared older generation for storing promoted objects, and a garbage collector configured to perform minor garbage collection by marking a plurality of cards as clean, wherein the plurality of cards designates ranges of memory locations in the shared older generation, marking a card selected from the plurality of cards as dirty to obtain a dirty card when a reference field of an object is modified, wherein the object is allocated in a promotion area selected from a plurality of promotion areas, wherein the promotion area is used to promote objects to the shared older generation only for a single task, and wherein a memory location of the reference field is designated by the card, examining the plurality of promotion areas and the plurality of cards to identify a region of the dirty card overlapping the promotion area, wherein promotion areas associated with other tasks are ignored, scanning the region of the dirty card overlapping the promotion area to identify roots of live young objects associated with the single task, and freeing a young object associated with the single task not identified as live during scanning.

In general, in one aspect, the invention relates to a computer readable medium. The computer readable medium comprises executable instructions for minor garbage collection by marking a plurality of cards as clean, wherein the plurality of cards designates ranges of memory locations in a shared older generation, marking a card selected from the plurality of cards as dirty to obtain a dirty card when a reference field of an object is modified, wherein the object is allocated in a promotion area selected from a plurality of promotion areas, wherein the promotion area is used to promote objects to the shared older generation only for a single task, and wherein a memory location of the reference field is designated by the card, examining the plurality of promotion areas and the plurality of cards to identify a region of the dirty card overlapping the promotion area, wherein promotion areas associated with other tasks are ignored, scanning the region of the dirty card overlapping the promotion area to identify roots of live young objects associated with the single task, and freeing a young object associated with the single task not identified as live during scanning.

Other aspects of the invention will be apparent from the following description and the appended claims.

DETAILED DESCRIPTION

Figure 1:
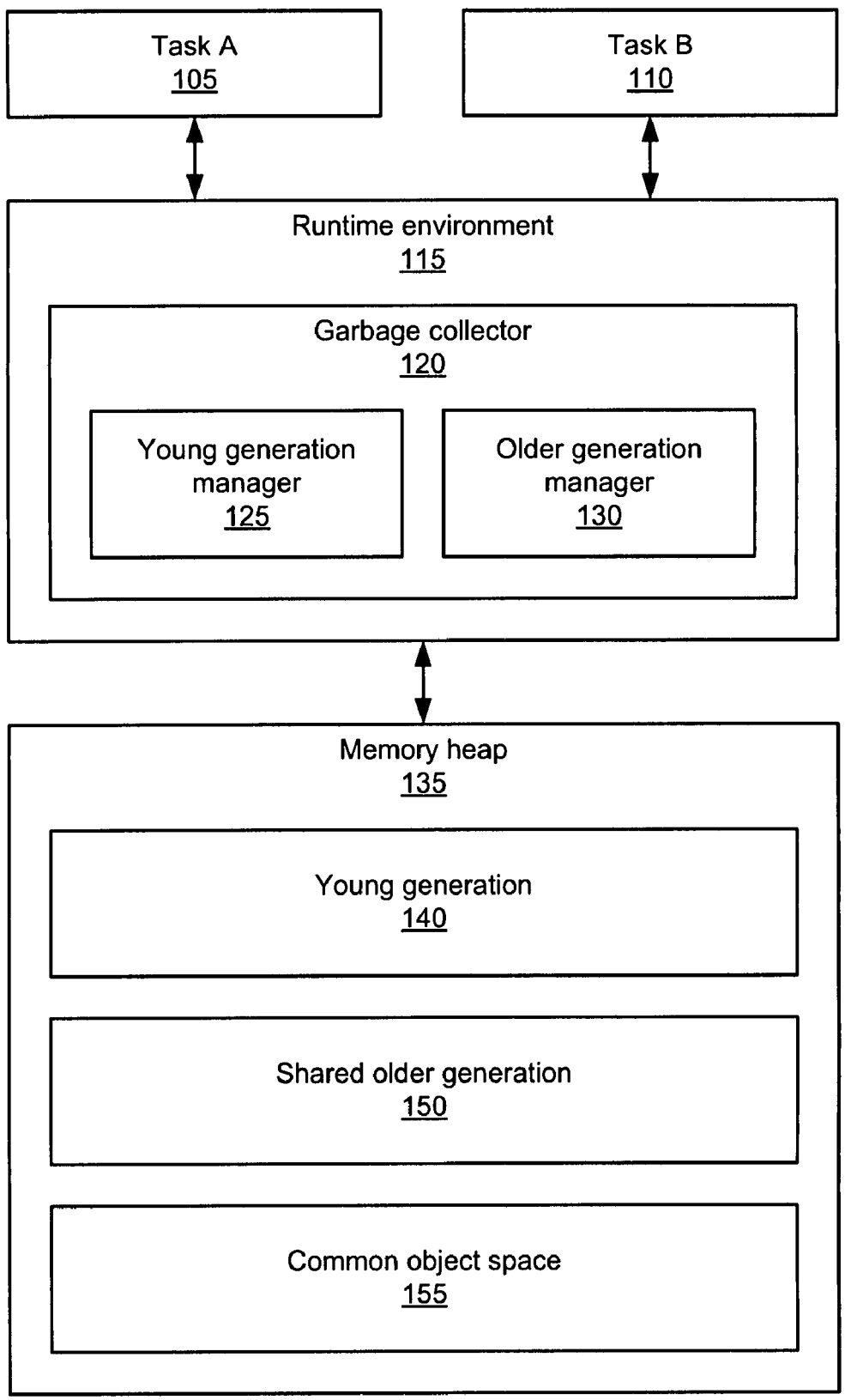
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for minor garbage collection. Cards designating ranges of memory locations in a shared older generation are initially marked as clean. As reference fields of objects in the shared older generation are updated, the corresponding cards are marked as dirty. During a task-specific minor garbage collection, promotion areas associated with the task are used to identify which regions of the shared older generation to scan for roots of live young objects. Clean cards and cards that do not overlap any promotion areas associated with the task are ignored.

For ease of discussion, embodiments of the invention are discussed herein using a single shared older generation. However, those skilled in the art will appreciate that multiple older generations may exist, some of which may not be shared between tasks. Specifically, in one or more embodiments, multiple older generations (whether shared or not) allow multiple levels of generational garbage collection. Accordingly, the scope of the invention should be not be considered limited to only a single older generation.

FIG. 1 shows a diagram of a system in accordance with one or more embodiments of the invention. A runtime environment (115) is configured to execute task A (105) and task B (110). Task A (105) and task B (110) may be any type of executable task, and may belong to the same software application or to different software applications. Further, the runtime environment (115) may be a Java™ virtual machine, a Microsoft®.NET framework, an operating system, or any other runtime environment that supports garbage collection. Java™ is a trademark of Sun Microsystems, Inc. located in Santa Clara, Calif. Microsoft® is a registered trademark of Microsoft Corporation located in Redmond, Wash.

In one or more embodiments, memory used by task A (105) and task B (110) is allocated to a memory heap (135). Specifically, the runtime environment (115) is configured to manage allocation of the memory heap (135) for task A (105) and task B (110). More specifically, the runtime environment (115) is configured to designate areas of the memory heap (135) for a young generation (140) and a shared older generation (150). The memory heap (135) may include random access memory (RAM), flash memory, any other type of rewritable computer storage, or any combination thereof.

In one or more embodiments, the young generation (140) is implemented as multiple task-specific young generations. Task-specific young generations are discussed in detail in copending U.S. patent application Ser. No. 11/705,378, entitled "Method and System for Garbage Collection in a Multitasking Environment," filed concurrently with this document and in the names of the same inventors and commonly owned by the same assignee, which was previously incorporated by reference in its entirety.

Further, another portion of the memory heap (135) may be designated as common object space (155), i.e., memory for allocating common objects between task A (105) and task B (110). Common object space (155) reduces the amount of memory required when multiple tasks are using the same objects. For example, objects storing runtime representations of classes and literal constant string values may be placed in the common object space (155). Those skilled in the art will appreciate that objects storing task-specific information should generally not be placed in the common object space (155).

In one or more embodiments, the runtime environment (115) includes a garbage collector (120). Specifically, the garbage collector (120) includes one or more modules (e.g., threads, classes, functions, etc.) for performing garbage collection. For example, the garbage collector (120) may include a young generation manager (125) configured to manage allocation of objects to the young generation (140). Further the garbage collector (120) may include an older generation manager (130) configured to manage allocation of objects to the shared older generation (150).

In one or more embodiments, the shared older generation (150) is a single contiguous region of memory, which is used to allocate promotion areas to tasks. Promotion areas are smaller contiguous regions of memory within the shared older generation (150). Specifically, each task may be assigned an initial promotion area when the task starts, and more promotion areas may be added when objects are promoted from the young generation (140) to the shared older generation (150) during minor garbage collections.

Figure 2:
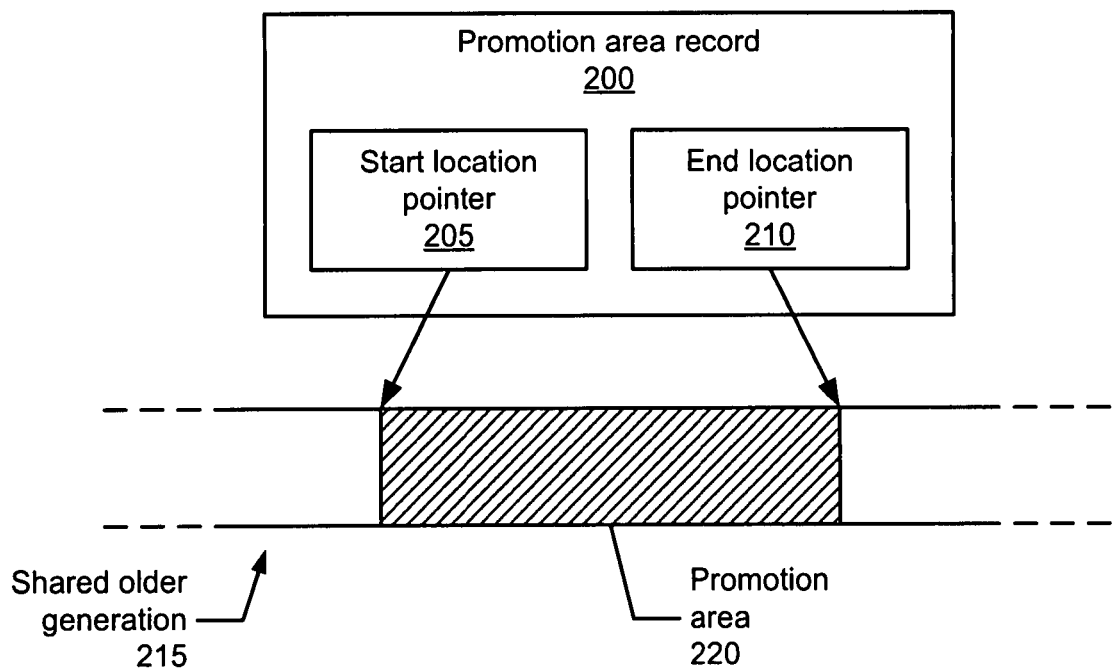
FIG. 2 shows a diagram of a shared older generation in accordance with one or more embodiments of the invention.

FIG. 2 shows a diagram of a shared older generation (215) in accordance with one or more embodiments of the invention. Specifically, FIG. 2 shows a diagram of a promotion area record (200) designating a promotion area (220) within the shared older generation (215). More specifically, the promotion area record (200) may include a start location pointer (205) and an end location pointer (210), indicating the beginning and end of the promotion area (220), respectively. Alternatively, the promotion area record (200) may include a start location pointer (205) and a value indicating the size of the promotion area (220). In one or more embodiments, promotion areas are sized to accommodate promotion of multiple objects.

Figure 3:
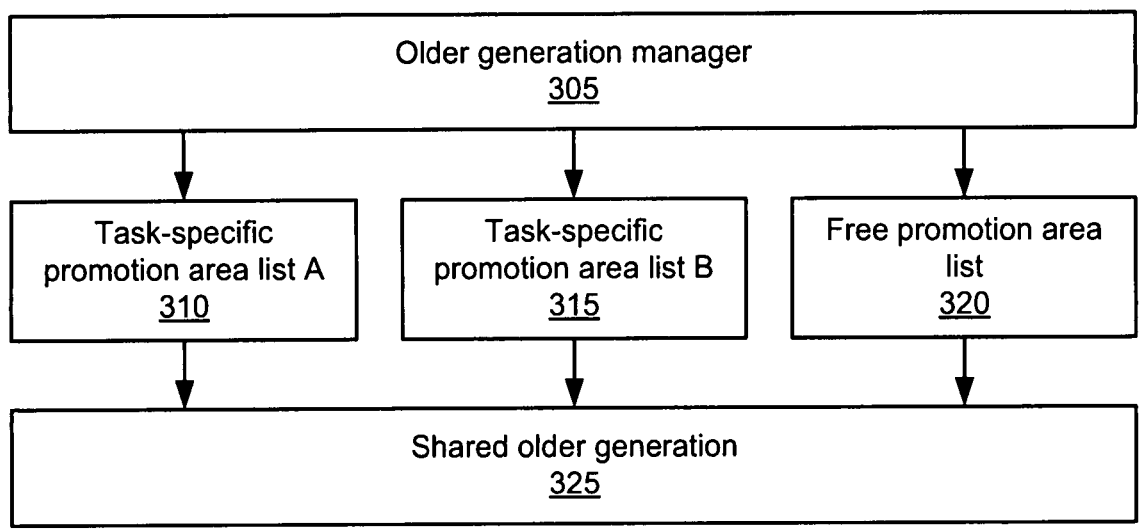
FIG. 3 shows a diagram of task-specific promotion area lists in accordance with one or more embodiments of the invention.

In one or more embodiments, promotion areas are task-specific. That is, each promotion area may be associated with only a single task at any given time. Accordingly, for each task, a task-specific promotion area list may be maintained. FIG. 3 shows a diagram of task-specific promotion area lists in accordance with one or more embodiments of the invention.

Specifically, as shown in FIG. 3, an older generation manager (305) is configured to maintain task-specific promotion area lists (e.g., task-specific promotion area list A (310), task specific promotion area list B (315)) for each task. The task-specific promotion area lists include promotion area records designating promotion areas within the shared older generation (325). Further, a free promotion area list (320) may be maintained. The free promotion area list (320) includes records of promotion areas that are freed when tasks terminate and/or during major garbage collections. Free promotion area lists are discussed in detail below.

Figure 4:
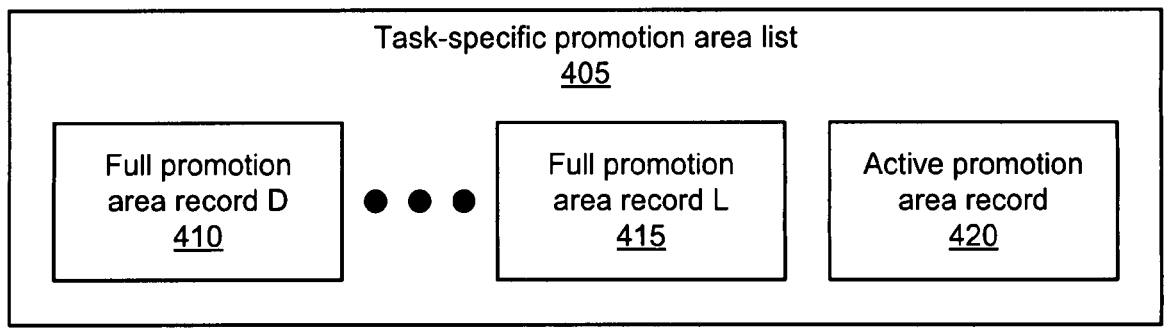
FIG. 4 shows an expanded diagram of a task-specific promotion area list in accordance with one or more embodiments of the invention.

Continuing with discussion of task-specific promotion area lists, FIG. 4 shows an expanded diagram of a task-specific promotion area list (405) in accordance with one or more embodiments of the invention. The task-specific promotion area list (405) includes an active promotion area record (420) designating a promotion area in which free memory is available to allocate promoted objects. Further, the task-specific promotion area list (405) may include one or more full promotion area records (e.g., full promotion area record D (410), full promotion area record L (415)), designating promotion areas that are no longer being used as active promotion areas.

Figure 5:
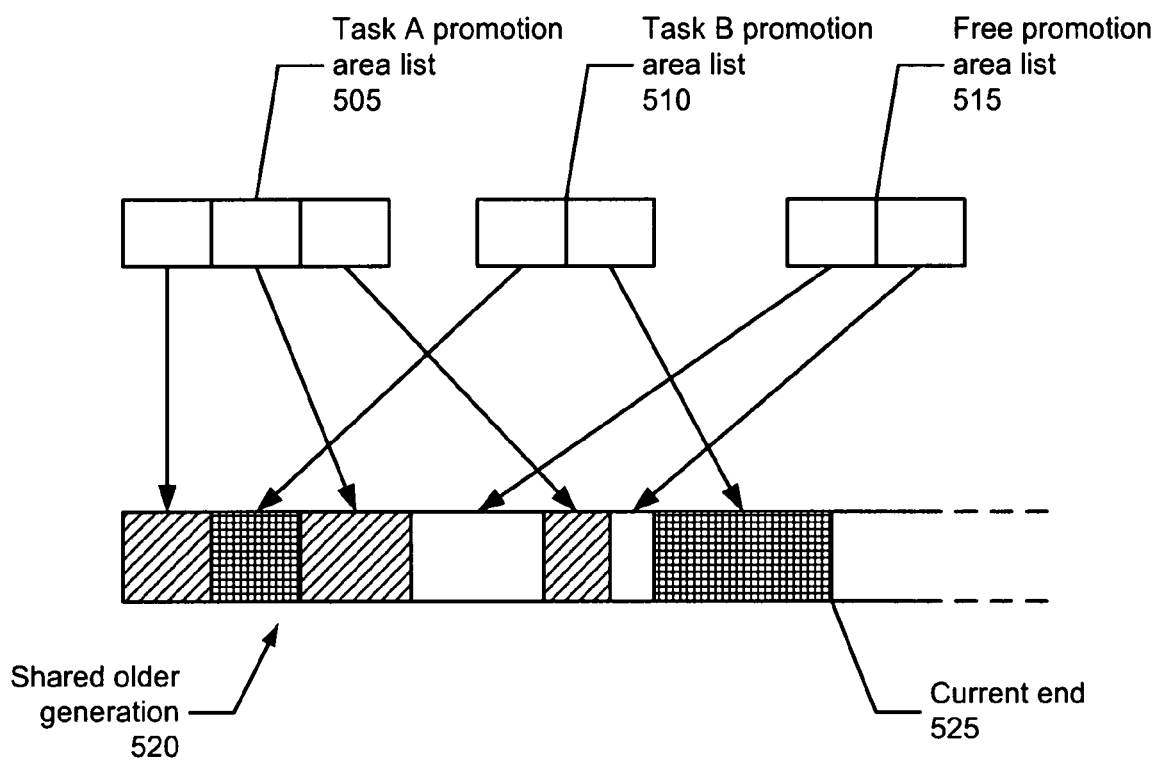
FIG. 5 shows a diagram of task-specific promotion area lists in accordance with one or more embodiments of the invention.

To illustrate the concept of task-specific promotion area lists, FIG. 5 shows a diagram of task-specific promotion area lists in accordance with one or more embodiments of the invention. FIG. 5 is provided for exemplary purposes only and should not be construed as limiting the scope of the invention.

As shown in FIG. 5, task A promotion area list (505) and task B promotion area list (510) are task-specific promotion area lists. Task A promotion area list (505) includes three promotion area records, and task B promotion area list (510) includes two promotion area records. The task-specific promotion area lists may be implemented, for example, as circular lists. Further, a free promotion area list (515) includes records of promotion areas that are not currently associated with any particular task.

In one or more embodiments, promotion areas are allocated in the shared older generation (520) only as needed, and free promotion areas at the end of the shared older generation (520) are discarded. Accordingly, the current end (525) of the shared older generation (520) may be identified as the end of the last full or active promotion area. In one or more embodiments, a pointer to the current end (525) of the shared older generation (520) is maintained and adjusted as promotion areas are created and/or discarded.

In one or more embodiments, task-specific promotion area lists provide a comprehensive view (except discarded promotion areas, as discussed in copending U.S. patent application Ser. No. 11/705,378, referenced above) of memory in the shared older generation used by individual tasks. Accordingly, when a task terminates, some or all of the task's memory in the shared older generation may be reclaimed without performing a major garbage collection. Further, because task-specific promotion area lists track objects belonging to the same task, task-specific promotion area lists may facilitate accounting of memory used by individual tasks.

Moreover, if task-specific young generations are used, then when a terminated task's promotion areas are freed, the task's young generation may also be freed without performing a minor garbage collection or any other type of object scanning. Specifically, freeing the task's promotion areas ensures that all references from the shared older generation to objects in the task-specific young generation are discarded. Accordingly, the task-specific young generation may be freed without any risk of leaving behind dangling references from the shared older generation to the task-specific young generation.

In addition, task-specific promotion area lists reduce the amount of the shared older generation to be scanned when identifying live objects during minor garbage collections. That is, identifying roots of young objects in the shared older generation is limited only to promotion areas associated with the same task. Using task-specific promotion areas to limit scanning of the shared older generation is discussed in detail below with respect to FIG. 7.

Moreover, by isolating objects belonging to different tasks, task-specific young generations and/or task-specific promotion area lists minimize synchronization issues when performing concurrent minor and/or major garbage collections for different tasks. Those skilled in the art will appreciate that synchronization of execution threads belonging to the same task may still be required.

Figure 6:
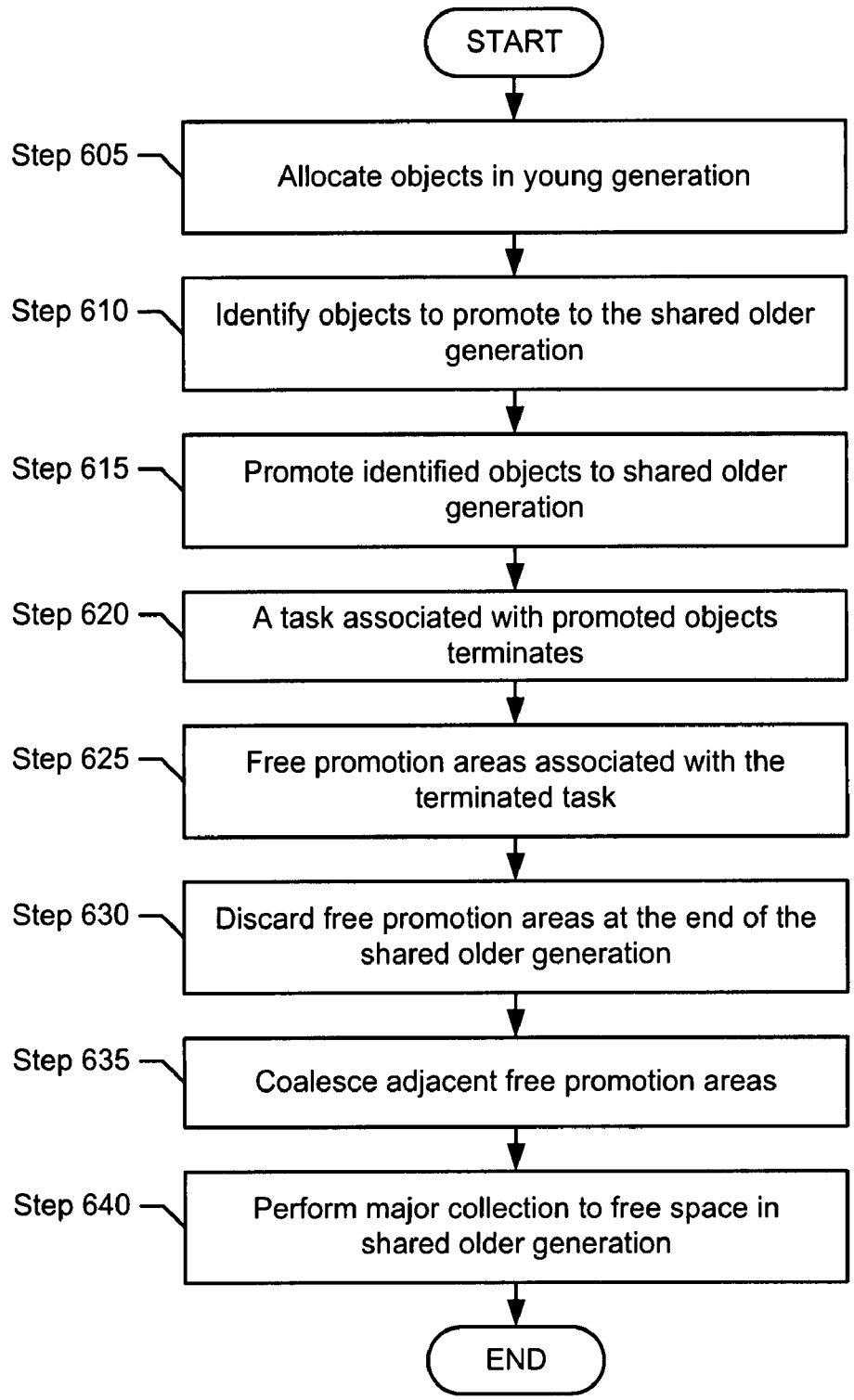
FIG. 6 shows a flowchart of a method for garbage collection in accordance with one or more embodiments of the invention.

FIG. 6 shows a flowchart of a method for garbage collection in accordance with one or more embodiments of the invention. In one or more embodiments, one or more of the steps shown in FIG. 6 may be omitted, repeated, and/or performed in a different order. Accordingly, the specific arrangement of steps shown in FIG. 6 should not be construed as limiting the scope of the invention.

In Step 605, objects are allocated to a young generation. As discussed above, in one or more embodiments, task-specific young generations may be used. In one or more embodiments, most objects are initially allocated in the young generation. However, some objects may be allocated in common object space, and some objects may be allocated directly in promotion areas in the shared older generation. For example, certain types of objects (e.g., task-private representations of classes) and/or objects that don't fit in the young generation may be tenured directly to the shared older generation. In one or more embodiments, the young generation is managed by a young generation manager (e.g., young generation manager (125) of FIG. 1).

In Step 610, as part of a minor garbage collection, objects to promote from the young generation to a shared older generation are identified. The minor garbage collection may be initiated, for example, when the young generation is full or meets a threshold utilization value. Alternatively, minor garbage collection may be explicitly initiated by a task.

In one or more embodiments, the decision of whether to promote an object is based on the object's age (e.g., how many minor garbage collections the object has already survived, an elapsed time period since the object's creation, etc.). Alternatively, the decision may be based on the object's size, any other similar criteria, or any combination thereof. Objects that do not meet promotion criteria may be left in the young generation.

Further, during the minor garbage collection, dead objects may be discarded. Many different techniques for differentiating between live objects and dead objects exist. For example, a garbage collector may use reference counting, mark-sweep collection, copying collection, mark-compact collection, any other garbage collection technique, or any combination thereof. In one or more embodiments, minor garbage collection uses techniques discussed below with respect to FIG. 7.

Continuing with discussion of FIG. 6, in Step 615, the identified objects are promoted to a shared older generation. Specifically, for each task, the identified objects associated with the task are promoted to one or more task-specific promotion areas in the shared older generation. Promoting objects to task-specific promotion areas is discussed in detail in copending U.S. patent application Ser. No. 11/705,378, referenced above.

In Step 620, a task terminates. Those skilled in the art will appreciate that a task may terminate for many different reasons. For example, a task may terminate when a method completes, when an error condition is met, etc. Regardless of the reason(s) for the task terminating, objects used only by the terminated task are no longer needed. Accordingly, in Step 625, promotion areas associated with the terminated task may be freed. Specifically, promotion area records associated with the terminated task may be moved to a free promotion area list, so that the freed promotion areas may be used by other tasks. In one or more embodiments, the promotion area records are moved immediately after the task terminates, without performing a major garbage collection.

In some cases, a promotion area that is freed may be located at the end of the shared older generation. Said another way, there may not be any full or active promotion areas after the free promotion area. Accordingly, in Step 630, the free promotion area may be discarded. That is, the promotion area record describing the freed promotion area is not added to the list of free promotion areas, but is discarded instead. Accordingly, the pointer to the current end of the older shared generation is set to the beginning of the freed promotion area. In one or more embodiments, discarding such promotion area records reduces the amount of memory required to manage the shared older generation.

Further, a freed promotion area may be located next to another free promotion area. Accordingly, in Step 635, adjacent free promotion areas may be coalesced. That is, the free promotion area records for the adjacent free promotion areas may be replaced with a single free promotion area record. Reducing the number of free promotion area records reduces the amount of memory required to manage the shared older generation. Further, because the coalesced free promotion area is larger than the individual free promotion areas, coalescing adjacent free promotion areas may allow for larger objects to be promoted without creating new promotion areas.

In one or more embodiments, in Step 640, a major garbage collection is performed. Major garbage collections free space in the shared older generation by discarding promoted objects that are no longer used. Major garbage collections are discussed in detail in copending U.S. patent application Ser. No. 11/705,378, referenced above.

As discussed above, minor garbage collection (e.g., as performed in Step 610) may involve discarding dead objects in the young generation. Specifically, if no live references to a given young object exist, the object is clearly no longer in use and may be discarded. Those skilled in the art will appreciate that a reference to a young object may exist in the shared older generation. More specifically, a reference field of an object in the shared older generation may reference a young object. In other words, the shared older generation may effectively contain a 'root' of a live young object. Therefore, it may be necessary to scan the shared older generation during minor garbage collection to identify roots of live young objects.

The most basic way to identify the roots of live young objects in the shared older generation is to scan the entire shared older generation. In such cases, the time to identify roots of live young objects is proportional to the size of the entire shared older generation. However, the time to identify roots of live young objects may be reduced by limiting the scope of the shared older generation to be scanned. For example, the scope of the shared older generation to be scanned may be limited using a card-marking scheme.

Card-marking involves maintaining multiple 'cards,' where each card references a range of memory locations in the shared older generation. Each card is initially marked as clean. Further, a "write barrier" is imposed for reference field updates in the shared older generation. Thus, when a reference field of an object in the shared older generation is modified, the write barrier is executed and the card corresponding to the object's memory location is marked as dirty. In some cases, a write barrier may also be executed when promoting an object from the young generation to the shared older generation, or in any other situation where a root of a live young object may be added and/or modified in the shared older generation.

In one or more embodiments, to be marked as clean, a card must not contain any references to the young generation. During minor garbage collection, only dirty cards are scanned to identify roots of live young objects. In this manner, minor garbage collection does not unnecessarily scan cards that cannot possibly contain references to the young generation.

Cards may be implemented as lists, tables, database entries, or any other similar type of data structure. Marking a card may involve modifying a Boolean variable (if only two marking values are used), an Integer, a text variable, or any other similar type of variable. For example, a card table may be implemented as an array of bytes, where each byte corresponds to a different card. In such cases, each type of marking is indicated by a unique byte value (e.g., 0, 1, etc.).

In one or more embodiments, all cards are sized equally according to the same power of two (e.g., 1024 bytes), with the address of the first card in the card table being aligned with the given power of two. Further, entries in the card table, when combined, may reference the entire range of heap memory. Moreover, the young generation(s) and shared older generation may all be located in contiguous regions of the heap.

If all of the aforementioned conditions are satisfied, then the relationships (using byte shift operations) shown in Table 1 are also satisfied, where CARD_SIZE is the aforementioned power of two, START_OF_HEAP is the memory address of the start of the heap, and CARD_ADDRESS_i is the memory address of the card at index i in the card table.

TABLE 1

Shift Operations

CARD_SIZE = 1 << CARD_SHIFT
START_OF_HEAP & ~(1 << CARD_SIZE) == START_OF HEAP
CARD_ADDRESS_i = START_OF_HEAP + i * (1 << CARD_SIZE)

Based on the relationships shown in Table 1, a write barrier for card marking may be implemented as shown in Table 2.

TABLE 2

Write Barrier Using a Shift Operation

CARD_TABLE[OBJECT_REFERENCE >> CARD_SHIFT] = 0;

Those skilled in the art will appreciate that many different ways of implementing card tables exist. In one or more embodiments, the use of a byte array and shift operations as described above minimizes the number of machine instructions required for each execution of the write barrier.

Figure 7:
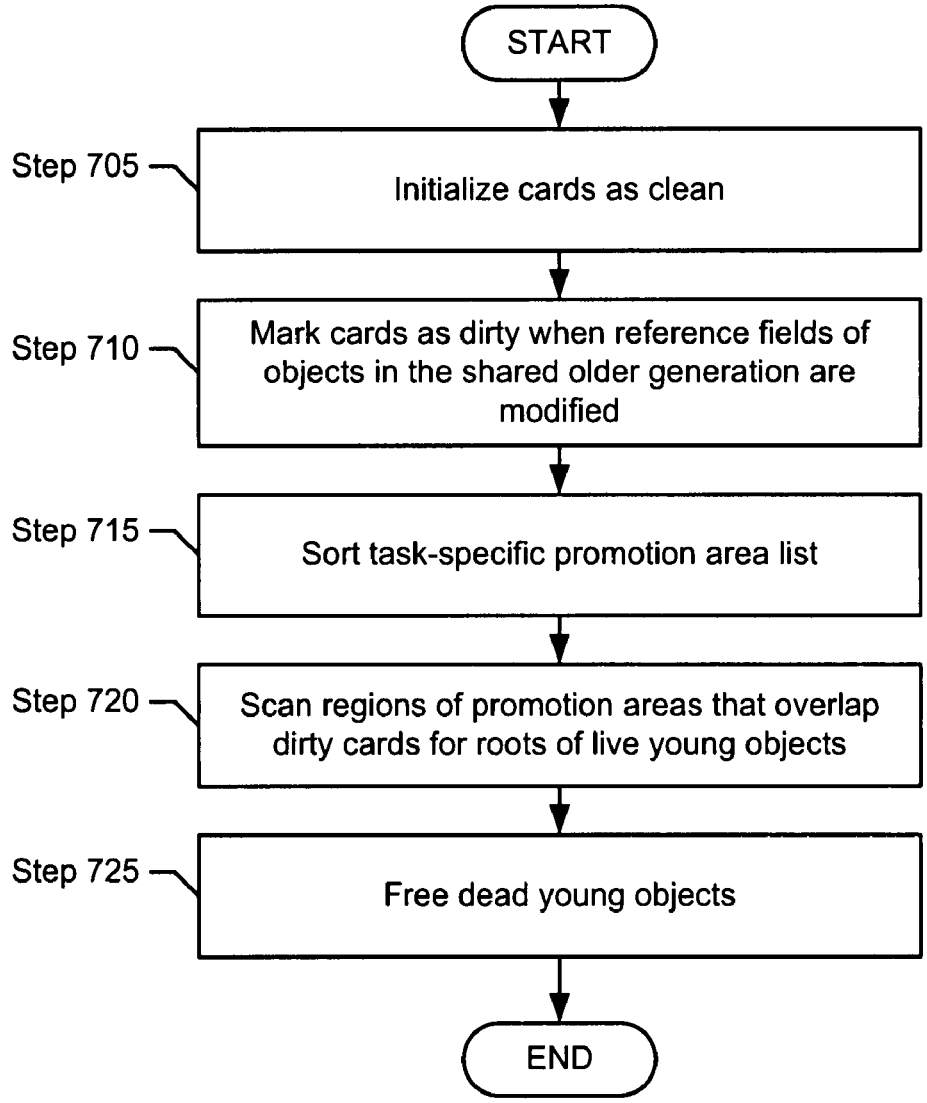
FIG. 7 shows a flowchart of a method for minor garbage collection in accordance with one or more embodiments of the invention.

In one or more embodiments, the scope of the shared older generation to be scanned may be further reduced when minor garbage collection is task-specific. Specifically, the scope of the shared older generation to be scanned may be reduced to only those dirty regions associated with the specific task. Expanding on this concept, FIG. 7 shows a flowchart of a method for minor garbage collection in accordance with one or more embodiments of the invention. In one or more embodiments, one or more of the steps shown in FIG. 7 may be omitted, repeated, and/or performed in a different order. Accordingly, the specific arrangement of steps shown in FIG. 7 should not be construed as limiting the scope of the invention.

Initially, in Step 705, all cards are initialized as clean. Specifically, each card is considered clean until a reference field of an object in the shared older generation is modified at a memory location designated by the card. In Step 710, as reference fields are modified in the shared older generation, the corresponding cards are marked as dirty. The dirty markings serve to track regions of memory where roots of live young objects may have been added and/or modified since the cards were last marked as clean.

Note that in Steps 705-710, minor garbage collection has not yet begun. Rather, Steps 705-710 describe runtime actions that provide a foundation for minor garbage collection. As discussed above, minor garbage collection may be initiated when the young generation is full, when the young generation satisfies a threshold utilization value, etc. Further, minor garbage collection may be initiated by the runtime environment, by a task executing in the runtime environment, etc. Generally, when minor garbage collection for a given task is initiated, the task is stopped so that the task's memory profile remains consistent during minor garbage collection.

In one or more embodiments, in Step 715, during a task-specific minor garbage collection, the corresponding task-specific promotion area list is sorted. For example, the task-specific promotion area list may be sorted by placing promotion area records in sequential order of the memory addresses referenced by each promotion area record. Although not required, sorting the task-specific promotion area list ensures that promotion areas are scanned sequentially, thereby improving translation lookaside buffer (TLB) locality. Those skilled in the art will appreciate that improving TLB locality may reduce TLB misses and consequently decrease the amount of time required to perform the minor garbage collection.

In Step 720, the task's promotion areas are examined to determine which of the promotion areas overlap dirty cards. Specifically, in one or more embodiments, the garbage collector iterates over the task-specific promotion area list and uses the card table to locate dirty cards that overlap the task's promotion areas. Each dirty card that overlaps one of the task's promotion area records is scanned for roots of live young objects. In one or more embodiments, if only a portion of a dirty card overlaps a promotion area record, then only the overlapping portion is scanned. Because the minor garbage collection is task-specific, it is not necessary to scan any dirty cards that only overlap promotion areas associated with other tasks. Further, it is not necessary to scan clean cards overlapping the task's promotion areas, because only dirty cards can possibly contain references to live young objects.

In one or more embodiments, Step 720 requires only a single iteration over the task-specific promotion area list. Further, by ignoring promotion areas for other tasks and regions of promotion areas overlapping clean cards, the scope of the older generation to be scanned for roots of live young objects may be significantly reduced. Thus, minor garbage collection executes more quickly, potentially providing faster performance for the specific task and/or any other tasks competing for processing cycles. Moreover, in view of the above discussion, those skilled in the art will appreciate that the aforementioned method of identifying roots of live young objects may be implemented without any changes to the write barrier(s) or to the tasks themselves.

In Step 725, any dead young objects associated with the task for which the minor garbage collection is being performed are freed. Specifically, any young objects for which no roots are found are clearly no longer in use, and may therefore be discarded to free memory.

Using the method shown in FIG. 7, dirty cards may be marked as clean again under many different circumstances. As a first example, dirty cards may be marked as clean when promotion areas are freed (e.g., when a task terminates). Specifically, if a dirty card is fully overlapped by a freed promotion area, then the dirty card cannot possibly reference any roots of live young objects. Accordingly, the dirty card may be marked as clean again.

Continuing with the aforementioned example, a dirty card that partly overlaps a freed promotion area may remain dirty. However, the part of the card that overlaps the freed promotion area may be modified so as to be ignored during future garbage collections. For example, the memory allocated to the freed promotion area may be converted to a byte array object. In one or more embodiments, byte array objects are ignored during garbage collection because they do not contain any reference fields. Thus, the freed portions of the card may be safely ignored the next time the dirty card is scanned.

As a second example, ail dirty cards may be marked as clean prior to a full garbage collection (i.e., a garbage collection for all tasks). Specifically, during a full garbage collection, the object hierarchy is traversed and a write barrier is executed for those objects containing references to live young objects. Thus, after a full garbage collection, cards that were incorrectly marked as dirty (e.g., if a reference field was modified but did not reference a young object) are no longer marked as dirty. Correcting the card markings in this manner allows for more efficient minor garbage collections between full garbage collections.

As a third example, a dirty card may be marked as clean again if a minor garbage collection shows that the dirty card does not reference any roots of live young objects. Specifically, a single promotion area overlaps the entire dirty card, and a scan of the promotion area does not identify any roots of live young objects, then the dirty card may be marked as clean again. In view of the above, those skilled in the art will appreciate that dirty cards may be marked as clean again under many different circumstances.

In one or more embodiments, using the aforementioned method (i.e., Steps 705, 710, 715, 720) decreases the amount of overhead (e.g., time, processing cycles, etc.) required to perform a minor collection, by limiting the scope of the shared older collection to be scanned for roots of live young objects. Thus, Step 725 is reached more quickly than if only clean/dirty markings are used, and accordingly memory is freed more quickly. In other words, the method described above frees unused memory more quickly than if clean/dirty markings are relied upon exclusively.

Figure 8A:
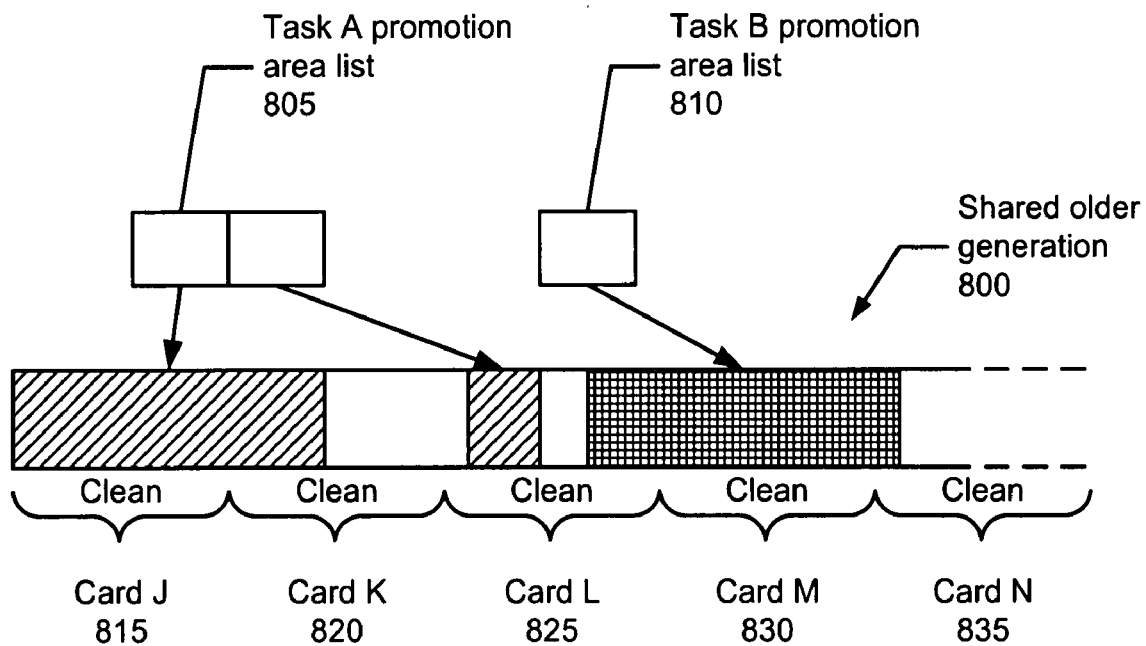
FIGS. 8A-8B show diagrams of an example of minor garbage collection in accordance with one or more embodiments of the invention.
Figure 8B:
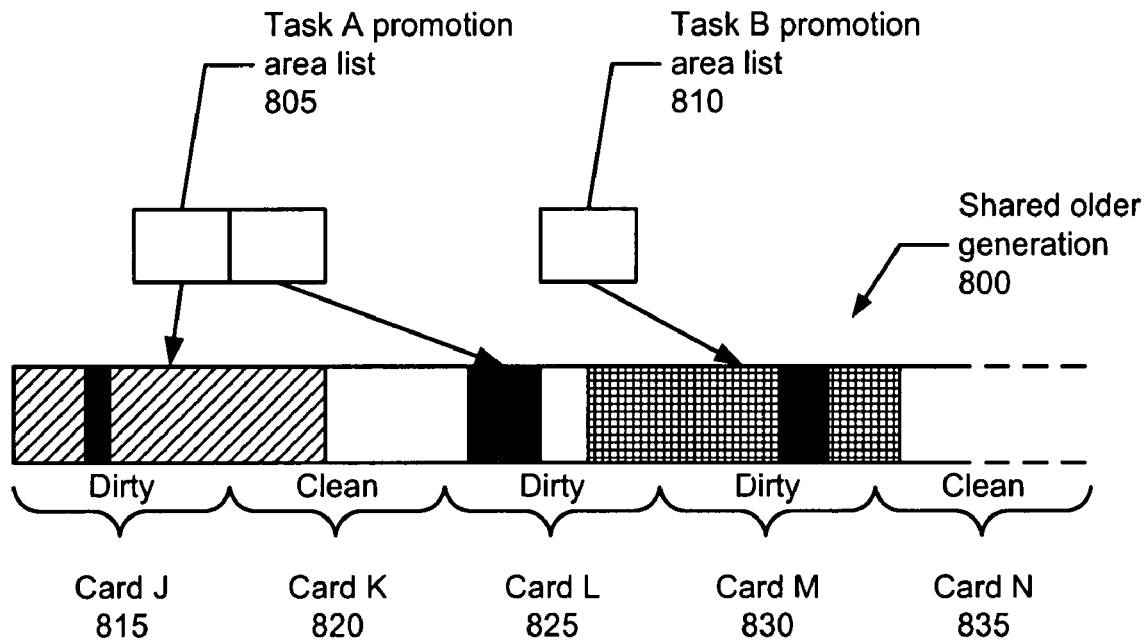
Figure 9:
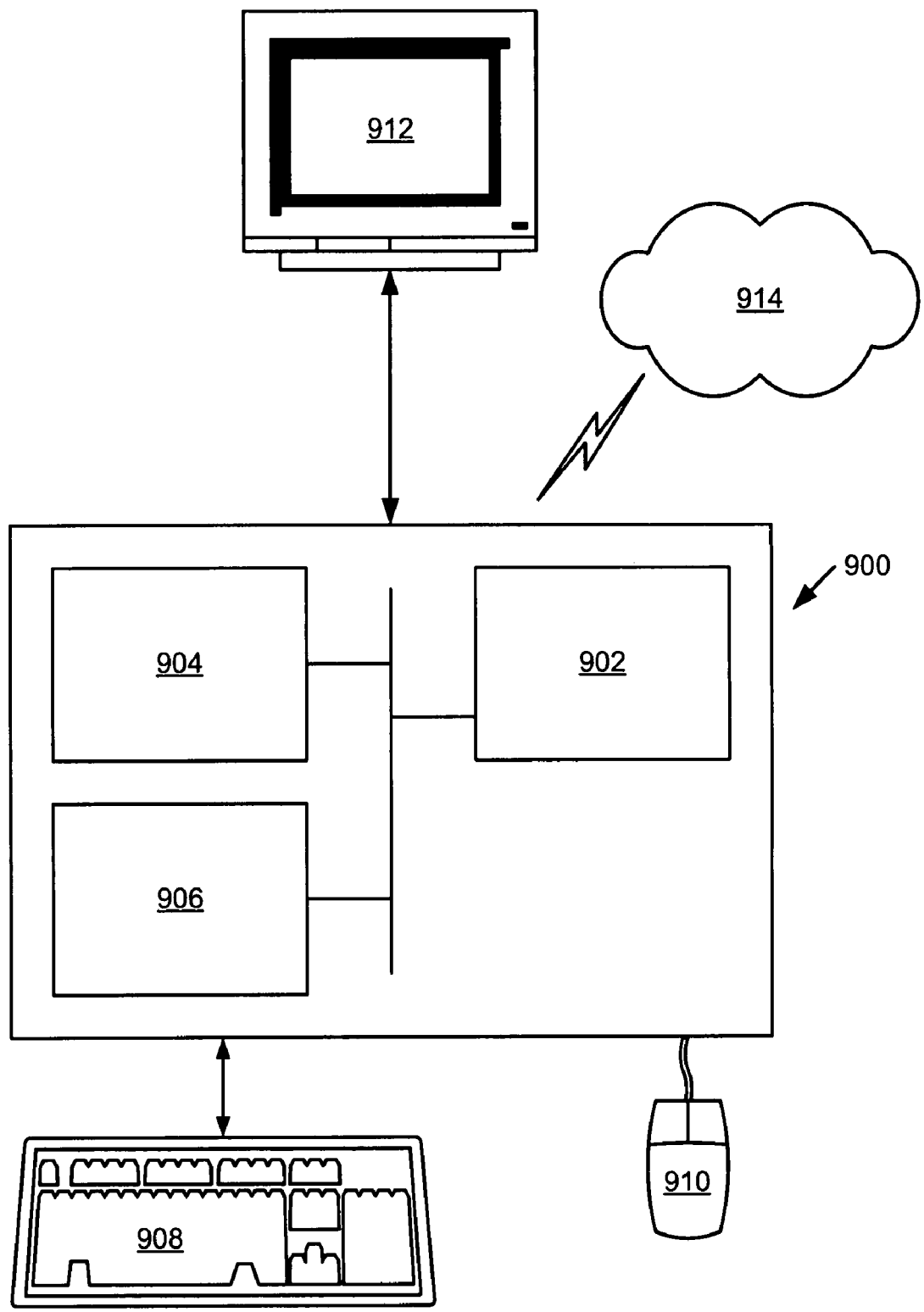
FIG. 9 shows a diagram of a computer system in accordance with one or more embodiments of the invention.

FIGS. 8A-8B show diagrams of an example of minor garbage collection in accordance with one or more embodiments of the invention. FIGS. 8A-8B are provided for exemplary purposes only and should not be construed as limiting the scope of the invention.

As shown in FIG. 8A, a shared older generation (800) includes three promotion areas for two tasks, as indicated by task A promotion area list (805) and task B promotion area list (810). Further, the shared older generation is referenced by multiple cards (i.e., card J (815), card K (820), card L (825), card M (830), card N (835)), each of which is currently marked as clean. Note that card J (815), card M (830), and card K (820) each only overlap a single promotion area, while card L (825) overlaps two promotion areas (for the purposes of this example, freed promotion areas are not included in these counts).

In FIG. 8B, reference fields of objects in the shared older generation (shown in solid black) are modified in each of the promotion areas. Based on the locations of the objects, card J (815), card L (825), and card M (830) are all marked as dirty, to indicate that these cards may reference roots of live young objects.

At this point, if a minor garbage collection is performed for task A, the garbage collector (not shown) iterates over task A promotion area list (805). For each promotion area in the list, the garbage collector determines which card table entries need to be checked for dirty markings.

For example, if the relationships shown in Table 1 and Table 2 are satisfied, then the cards at the boundaries of each promotion area may be identified as shown in Table 3, where FIRST_CARD_INDEX is the card table index of the card overlapping the beginning of the promotion area, and LAST_CARD_INDEX is the card table index of the card overlapping the end of the promotion area. AREA_START and AREA_END are the first and last memory addresses of the promotion area, respectively.

TABLE 3

Determining First and Last Cards for a Promotion Area

FIRST_CARD_INDEX = AREA_START >> CARD_SHIFT
LAST_CARD_INDEX = AREA_END >> CARD_SHIFT

For a given promotion area, all cards within the index range of FIRST_CARD_INDEX and LAST_CARD_INDEX must be examined for dirty markings. In this particular example, for task A's first promotion area (shown farthest to the left), card J (815) and card K (820) must be examined. For task A's second promotion area, only card L (825) must be examined.

After examining card J (815), card K (820), and card L (825) for dirty markings, only card J (815) and card L (825) are scanned for roots of live young objects, because card J (815) and card L (825) are dirty. Card K (820) is ignored, because card K (820) is clean. Further, card M (830) and card N (835) are not considered at all, because none of task A's promotion areas overlap card M (830) or card N (835).

Similarly, if a minor garbage collection is performed for task B, then the garbage collector uses task B promotion area list (810) to determine which cards need to be examined for dirty markings. In this example, card L (825), card M (830), and card N (835) are examined for dirty markings, because all three cards overlap task B's promotion area. In one or more embodiments, the computations shown in Table 3 are used to determine which cards to examine for dirty markings.

After examining card L (825), card M (830), and card N (835) for dirty markings, only card L (825) and card M (830) are scanned for roots of live young objects, because card L (825) and card M (830) are dirty. However, in one or more embodiments, only the region of card L (825) overlapping task B's promotion area is scanned. Specifically, the start addresses of card L (825) and the promotion area may be compared, with the highest of the two values determining the start boundary for scanning—in this case, the start address of the promotion area.

Nonetheless, the scan of the limited region of card L (825) would not identify any roots of live young objects, because card L (825) was only marked dirty in association with task A. Thus, the dirty marking is effectively a false-positive relative to task B. Card J (815) and card K (820) are not considered at all, because task B's promotion area does not overlap card J (815) or card K (820). Further, the region of task B's promotion area overlapping card N (835) is ignored, because card N (835) is clean.

To avoid the false-positive scenario described above, in one or more embodiments, promotion areas are sized as an integer multiple of a fixed card size. Further, the boundaries of the promotion areas may be aligned with boundaries of the cards. In other words, the beginning of each promotion area is also the beginning of a card, and the end of each promotion area is also the end of a card (either the same card or a different card). Thus, each card is always fully overlapped by only one promotion area. Using this sizing scheme, it is entirely impossible for a single card to overlap multiple promotion areas. Accordingly, minor garbage collection doesn't waste resources scanning dirty cards unnecessarily.

While embodiments of the invention are discussed herein using promotion areas, it is also possible to reduce the scope of the shared older generation scanned without using promotion areas. Specifically, cards may be marked as clean, dirty, or single-dirty, where single-dirty cards only reference roots of live young objects associated with a single task. Cards are marked as single-dirty during a minor garbage collection or a full garbage collection. Thus, unless a single-dirty card is marked as dirty again, the single-dirty marking is available during a subsequent minor garbage collection. Single-dirty markings are discussed in detail in U.S. patent application Ser. No. 11/705,378, entitled "Method and system for garbage collection in a multitasking environment" and filed Dec. 2, 2007 in the names of the same inventors as the present application and having a common assignee.

Embodiments of the invention may be implemented on virtually any type of computer regardless of the platform being used. For example, as shown in FIG. 12, a computer system (1200) includes a processor (1202), associated memory (1204), a storage device (1206), and numerous other elements and functionalities typical of today's computers (not shown). The computer (1200) may also include input means, such as a keyboard (1208) and a mouse (1210), and output means, such as a monitor (1212). The computer system (1200) may be connected to a network (1214) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (1200) may be located at a remote location and connected to the other elements over a network. Further, embodiments of the invention may be implemented on a distributed system having a plurality of nodes, where each portion of the invention (e.g., task, runtime environment, garbage collector, young generation manager, older generation manager, memory heap, young generation, shared older generation, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for minor garbage collection comprising:
   marking a plurality of cards as clean, wherein the plurality of cards designates ranges of memory locations in a shared older generation;
   marking a card selected from the plurality of cards as dirty to obtain a dirty card when a reference field of an object is modified,
      wherein the object is allocated in a promotion area selected from a plurality of promotion areas,
      wherein the promotion area is used to promote objects to the shared older generation only for a single task, and
      wherein a memory location of the reference field is designated by the card;
   examining the plurality of promotion areas and the plurality of cards to identify a region of the dirty card overlapping the promotion area, wherein promotion areas associated with other tasks are ignored;
   scanning the region of the dirty card overlapping the promotion area to identify roots of live young objects associated with the single task; and
   freeing a young object associated with the single task not identified as live during scanning.

2. The method of claim 1, wherein the region of the dirty card overlapping the promotion area is the entire dirty card.

3. The method of claim 2, further comprising:
   marking the dirty card as clean when the promotion area is freed.

4. The method of claim 2, further comprising:
   marking the dirty card as clean when the dirty card does not contain any roots of live young objects.

5. The method of claim 1, wherein examining the plurality of promotion areas and the plurality of cards comprises iterating through a task-specific promotion area list.

6. The method of claim 5, further comprising:
   sorting the task-specific promotion area list before examining the plurality of promotion areas and the plurality of cards.

7. The method of claim 1, wherein a size of the promotion area is an integer multiple of a size of the card, and wherein a boundary of the promotion area is aligned with a boundary of the card.

8. A system comprising:
   a young generation for storing young objects;
   a shared older generation for storing promoted objects; and
   a garbage collector configured to perform minor garbage collection by:
      marking a plurality of cards as clean, wherein the plurality of cards designates ranges of memory locations in the shared older generation;
      marking a card selected from the plurality of cards as dirty to obtain a dirty card when a reference field of an object is modified,
         wherein the object is allocated in a promotion area selected from a plurality of promotion areas,
         wherein the promotion area is used to promote objects to the shared older generation only for a single task, and
         wherein a memory location of the reference field is designated by the card;
      examining the plurality of promotion areas and the plurality of cards to identify a region of the dirty card overlapping the promotion area, wherein promotion areas associated with other tasks are ignored;
      scanning the region of the dirty card overlapping the promotion area to identify roots of live young objects associated with the single task; and
      freeing a young object associated with the single task not identified as live during scanning.

9. The system of claim 8, wherein the region of the dirty card overlapping the promotion area is the entire dirty card.

10. The system of claim 9, wherein the garbage collector is further configured to perform minor garbage collection by:
    marking the dirty card as clean when the promotion area is freed.

11. The system of claim 9, wherein the garbage collector is further configured to perform minor garbage collection by:
    marking the dirty card as clean when the dirty card does not contain any roots of live young objects.

12. The system of claim 8, wherein examining the plurality of promotion areas and the plurality of cards comprises iterating through a task-specific promotion area list.

13. The system of claim 12, wherein the garbage collector is further configured to perform minor garbage collection by:
    sorting the task-specific promotion area list before examining the plurality of promotion areas and the plurality of cards.

14. The system of claim 8, wherein a size of the promotion area is an integer multiple of a size of the card, and wherein a boundary of the promotion area is aligned with a boundary of the card.

15. A computer readable medium comprising executable instructions for minor garbage collection by:
    marking a plurality of cards as clean, wherein the plurality of cards designates ranges of memory locations in a shared older generation;
    marking a card selected from the plurality of cards as dirty to obtain a dirty card when a reference field of an object is modified,
       wherein the object is allocated in a promotion area selected from a plurality of promotion areas,
       wherein the promotion area is used to promote objects to the shared older generation only for a single task, and
       wherein a memory location of the reference field is designated by the card;
    examining the plurality of promotion areas and the plurality of cards to identify a region of the dirty card-overlapping the promotion area, wherein promotion areas associated with other tasks are ignored;
    scanning the region of the dirty card overlapping the promotion area to identify roots of live young objects associated with the single task; and
    freeing a young object associated with the single task not identified as live during scanning.

16. The computer readable medium of claim 15, wherein the region of the dirty card overlapping the promotion area is the entire dirty card.

17. The computer readable medium of claim 16, further comprising executable instructions for minor garbage collection by:
    marking the dirty card as clean when the promotion area is freed.

18. The computer readable medium of claim 16, further comprising executable instructions for minor garbage collection by:
    marking the dirty card as clean when the dirty card does not contain any roots of live young objects.

19. The computer readable medium of claim 15, wherein examining the plurality of promotion areas and the plurality of cards comprises iterating through a task-specific promotion area list and sorting the task-specific promotion area list before examining the plurality of promotion areas and the plurality of cards.

20. The computer readable medium of claim 15, wherein a size of the promotion area is an integer multiple of a size of the card, and wherein a boundary of the promotion area is aligned with a boundary of the card.

* * * * *